US006604032B1

United States Patent
Möller (10) Patent No.: US 6,604,032 B1
(45) Date of Patent: Aug. 5, 2003

(54) DIAGNOSTIC SYSTEM IN AN ENGINE MANAGEMENT SYSTEM

(75) Inventor: Peter Möller, Mölndal (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/381,984

(22) PCT Filed: Mar. 30, 1998

(86) PCT No.: PCT/SE98/00582

§ 371 (c)(1),
(2), (4) Date: Dec. 22, 1999

(87) PCT Pub. No.: WO98/44251

PCT Pub. Date: Oct. 8, 1998

(30) Foreign Application Priority Data

Apr. 1, 1997 (SE) .............................................. 9701193

(51) Int. Cl.⁷ ........................ G06G 19/00; G01M 17/00
(52) U.S. Cl. ............................ 701/29; 701/35; 701/114
(58) Field of Search ................................ 701/101, 102, 701/103, 114, 115, 29, 32, 34, 35, 99, 31; 702/183, 185, 187; 700/81; 709/217, 218, 227, 228; 340/438, 439; 707/10; 123/479, 688, 690; 73/117.2, 117.3, 118.1

(56) References Cited

U.S. PATENT DOCUMENTS

| | | | |
|---|---|---|---|
| 4,128,005 A | | 12/1978 | Arnston et al. ............ 73/117.3 |
| 5,041,976 A | * | 8/1991 | Marko et al. .............. 701/29 |
| 5,056,023 A | * | 10/1991 | Abe ........................ 701/32 |
| 5,276,619 A | * | 1/1994 | Ohara et al. ............... 701/35 |
| 5,331,560 A | | 7/1994 | Tamura .................... 701/115 |
| 5,388,045 A | * | 2/1995 | Kamiya et al. ............. 701/35 |
| 5,433,107 A | * | 7/1995 | Angermaier et al. ........ 73/117.3 |
| 5,671,141 A | | 9/1997 | Smith et al. ............... 701/29 |
| 6,314,422 B1 | * | 11/2001 | Barker et al. .............. 701/29 |

FOREIGN PATENT DOCUMENTS

WO       97/13064       4/1997

OTHER PUBLICATIONS

Patent Abstracts of Japan, abstract of JP 7–190897 A (Ford Motor Co), Jul. 28, 1995.

* cited by examiner

*Primary Examiner*—Willis R. Wolfe
(74) *Attorney, Agent, or Firm*—Lerner, David, Littenberg, Krumholz & Mentlik, LLP (57) ABSTRACT

A diagnostic system in an engine management system is provided for generating a diagnostic trouble code (DTC) to indicate the operational status of a component or a subsystem. The diagnostic system includes a diagnostic function module (DF module) for each DTC or a group of related DTCs associated with a component or sub-system. The DF module includes means for executing an evaluation routine to evaluate a component/sub-system to which the DTC of the specific DF module relates, and a dynamic scheduler for determining which DF module may be allowed to execute an evaluation routine at a particular time. Each DF module includes means for producing a ranking value dependent on the operating status of the component or sub-system being evaluated, a ranking value being generated each time an evaluation routine is performed; means for processing and storing statistical results of the ranking values obtained over a number of evaluation routines; means for evaluating the statistical results to produce evaluated data in the form of either an evaluated no-fault signal or an evaluated fault signal, and means for establishing the priority of the associated evaluation routine, and means for transmitting the evaluated signals to the dynamic scheduler.

14 Claims, 8 Drawing Sheets

| Entries for Inhibit, Time and Priority Handler. | Delay Times. | | Priority. | | DTC Evaluations to inhibit. | | | | |
|---|---|---|---|---|---|---|---|---|---|
| | No-Fault. | Fault. | Group. | Lev. | | | | | |
| DTC Eval. A. | 300 s. | 300 s. | X. | 2. | DTC Eval. B. | DTC Eval. E. | | | |
| DTC Eval. B. | 600 s. | 350 s. | Y. | 3. | DTC Eval. C. | DTC Eval. G. | | | |
| DTC Eval. C. | 200 s. | 0 s. | XY. | 1. | DTC Eval. D. | DTC Eval. E. | | | |
| DTC Eval. D. | 100 s. | 0 s. | Y. | 2. | DTC Eval. G. | DTC Eval. F. | | | |
| DTC Eval. E. | 0 s. | 0 s. | XY. | 4. | DTC Eval. G. | | | | |
| DTC Eval. F. | 200 s. | 400 s. | 0. | 0. | | | | | |
| DTC Eval. G. | 900 s. | 350 s. | X. | 5. | | | | | |

Scheduler Table.

FRZF Table.

Common FRZF parameters (pos. 6-15 in DTC-Block).

| 14 | 2 | 43 | 5 | 21 | 4 | 22 | 32 | 9 | 54 |
|----|---|----|---|----|---|----|----|---|----|

| DTC entries | DTC specific FRZF parameters (pos. 16-19 in DTC-Block). | | | |
|---|---|---|---|---|
| DTC A | 15 | 26 | 27 | 58 |
| DTC B | 15 | 36 | 37 | 48 |
| DTC C | 8 | 16 | 17 | 28 |
| DTC X | 10 | 16 | 17 | 38 |

Extended FRZF Table.

| DTC entries | DTC specific Extended FRZF parameters. | | | | | |
|---|---|---|---|---|---|---|
| DTC A | 11 | 12 | 33 | 40 | 50 |
| DTC B | 11 | 22 | 33 | 44 | 52 |
| DTC C | 21 | 12 | 38 | 48 | 52 |
| DTC X | 21 | 12 | 38 | 48 | 52 |

DTC-Block.

| No. | Parameter. | Size. |
|---|---|---|
| 1. | DTC. | 2 bytes. |
| 2. | DTC-Block Status. | At minimum 3 bits. |
| 3. | Latest DTC-Subcode. | 2 bytes. |
| 4. | Initial DTC-Subcode. | 2 bytes. |
| 5. | FRZF Delay Time. | Implementation spec. |
| 6. | Time Stamp (or No of WUCs since Reset of DTCs). | Parameter specific. |
| 7. | Time After Engine Start. | Parameter specific. |
| 8. | Ambient Air Temp. | Parameter specific. |
| 9. | Ambient Air Pressure. | Parameter specific. |
| 10. | Vehicle Speed. * | Parameter specific. |
| 11. | Engine Speed. * | Parameter specific. |
| 12. | Engine Load. * | Parameter specific. |
| 13. | Engine Coolant Temperature. * | Parameter specific. |
| 14. | Fuel Trim. * | Parameter specific. |
| 15. | System Status Register. (*) | 3 bytes. |
| 16. | DTC Specific Parameter 1. | 2 bytes. |
| 17. | DTC Specific Parameter 2. | 2 bytes. |
| 18. | DTC Specific Parameter 3. | 2 bytes. |
| 19. | DTC Specific Parameter 4. | 2 bytes. |
| 20. | Pointer To The Corresponding Extended FRZF. | Implementation spec. |

Extended FRZF

| Id. No. in Global Data Area List. | Time Base | Samples | | | | | |
|---|---|---|---|---|---|---|---|
| Parameter 1 | 7 | A | 1 | 2 | | Y-1 | Y |
| Parameter 2 | 14 | B | 1 | 2 | | Y-1 | Y |
| Parameter 3 | 23 | C | 1 | 2 | | Y-1 | Y |
| Parameter 4 | 54 | D | 1 | 2 | | Y-1 | Y |
| Parameter 5 | 77 | D | 1 | 2 | | Y-1 | Y |

← Latest sample in the Rotating Buffer.

← First sample in the Rotating Buffer.

DIAGNOSTIC SYSTEM IN AN ENGINE MANAGEMENT SYSTEM

TECHNICAL FIELD

The present invention relates to a diagnostic system in an engine management system for generating a diagnostic trouble code (DTC) to indicate the operational status of a component or sub-system which is being evaluated by the diagnostic system.

The invention also relates to a dynamic scheduler for determining the order of execution of a plurality of engine control functions and a plurality of evaluation routines in a diagnostic system.

The invention further relates to a DF (diagnostic function) module for executing an evaluation routine during a driving cycle to detect a fault in a component or sub-system in an engine management system, for generating a diagnostic trouble code (DTC) to indicate the operational status of the component or sub-system, and for determining the priority with which the evaluation routine should be executed.

BACKGROUND OF THE INVENTION

In order to ensure that drivers of vehicles are made aware of any faults which may arise in an engine management system, self-diagnostic systems are employed to monitor the components or sub-systems in the engine management system and to communicate a warning to the driver should a fault be detected. Such a warning may be in the form of a malfunction indication lamp (MIL) which is illuminated on the vehicle dashboard. Depending on the severity of the fault, the driver may be instructed to visit a workshop immediately to have the fault rectified or, in the case of a minor fault, he may wait until the next scheduled visit to the workshop.

For certain engine management systems, primarily those which affect exhaust emissions, legislation dictates how frequently and under what circumstances diagnostic checks are to be performed. Accordingly, standard driving cycles exist during which all diagnostic checks must be completed. Legislation also requires that, should certain faults be detected during two consecutive driving cycles, these faults be permanently recorded in a memory so that they may be later accessed in the workshop.

Examples of engine management systems include an engine control module, an exhaust gas recirculation system, an evaporated fuel processing system, a secondary air system and a catalytic converter monitoring system. Further components which require monitoring may include an engine coolant temperature sensor, a mass air flow meter sensor, an engine speed sensor, etc. Whilst the functioning of some components can be checked virtually independently of the operating conditions of the engine, many components and systems can only be checked when certain operating parameters prevail, e.g engine load, temperature, engine speed, etc.

Accordingly, diagnostic systems have been developed which prioritize certain diagnostic checks over others. For example, a priority system is described in U.S. Pat. No. 5,331,560 in which certain diagnostic checks can be interrupted if operating conditions dictate that a diagnostic check can be performed on an engine management system for which the necessary operating parameters only rarely occur. Once the existing diagnostic check has been interrupted, the prioritized check can then be performed.

Due to the interrelationship between many components and sub-systems making up the engine management system, if operating conditions are such that a diagnostic check may be performed on one component or sub-system, it is necessary to inhibit diagnostic checks on other components or sub-systems which may otherwise affect the validity of the result of the diagnostic check. For conventional diagnostic systems, this implies that if a component or sub-system is added or deleted, the diagnostic system must be reprogrammed to ensure that the diagnostic system is aware of the effect of the new/deleted component or sub-system on the remainder of the engine management system. Naturally, the same problem arises when it is desired to implement the same diagnostic system in a different vehicle model.

The above-mentioned interrelation between various components and sub-systems further implies that should a fault be detected in one component, the effect of the fault may be reflected during diagnostic checks performed on several components or sub-systems. It is therefore desirable that means be available to accurately determine where the root cause of a fault lies and that no false fault signals be recorded.

This interrelationship also means that there may be engine control functions (EC), the execution of which would interfer with the execution of one or several diagnostic functions. For this reason it is desirable that the diagnostic system can prevent the simultaneous execution of diagnostic functions and engine control functions which interfer with each other.

In order to assist the workshop or manufacturer in determining why a certain fault has arisen, it would be useful to be able to obtain information pertaining to the actual operating conditions of the vehicle from the time the fault arose up to the point when the fault was detected. This possibility has not been available up until now.

SUMMARY OF THE INVENTION:

It is therefore an object of the present invention to provide a diagnostic system which quickly identifies faults, particularly in components or sub-systems relating to exhaust emissions, and which can easily be adapted to different engine and vehicle models.

This object is achieved by a system according to claim 1.

By grouping everything needed for each component or sub-system in a specific DF module to (i) determine the priority with which the evaluation routine associated with that DF module should be executed, (ii) perform an evaluation routine to detect a fault, (iii) store the evaluated results statistically, (iv) filter the evaluated results to decide when to create DTC-data and, preferably, (v) decide in the case when reported valid when to store or erase the DTC-data and when to illuminate or extinguish the MIL, and by controlling the order of executing the evaluation routines of all the DF modules in the diagnostic system from a single dynamic scheduler, the diagnostic system can be quickly adapted to changes of components or sub-systems since each DF module will be independent of the others.

A further object of the present invention is to provide a DF module which contains sufficient means to be able to decide independently whether certain data is to be stored.

This object is achieved by the DF module according to claim 12.

Preferred embodiments of the present invention are detailed in the dependent claims.

BRIEF DESCRIPTION OF THE DRAWINGS:

The invention will be described in greater detail in the following by way of example only and with reference to the attached drawings, in which.

DETAILED DESCRIPTION OF PREFERRED EMBODIMENTS

Figure 1:
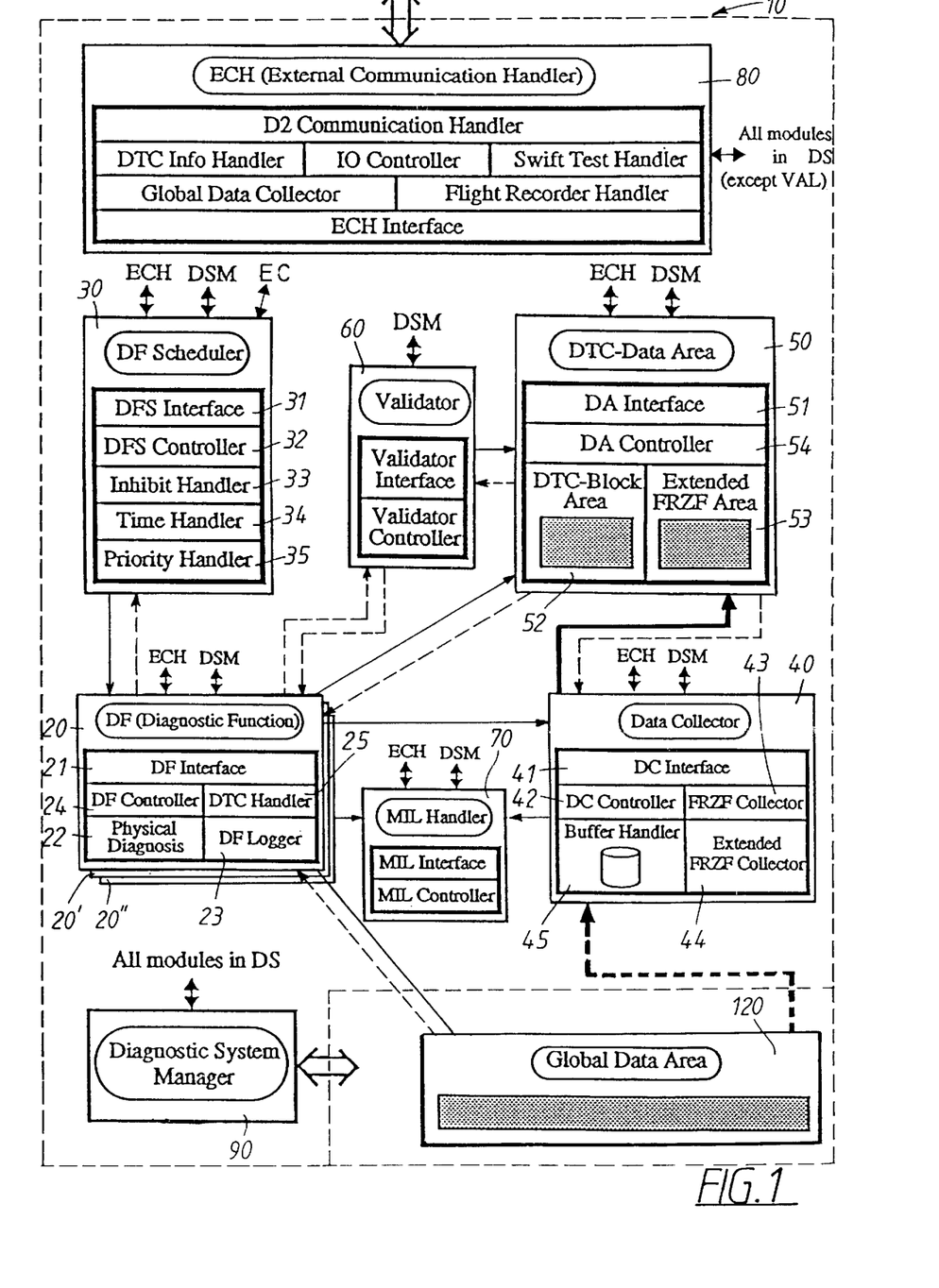
FIG. 1 is a block diagram of a diagnostic system according to the present invention.

In FIG. 1, reference numeral 10 generally denotes a diagnostic system according to the present invention. The system includes a plurality of diagnostic function modules (hereinafter referred to as DF modules) 20, 20', 20", with each DF module serving a component or sub-system, the operating status of which is to be evaluated. Examples of such components and sub-systems are an oxygen sensor in the exhaust pipe, an air leakage detection circuit, fuel injectors, an exhaust gas recirculation system, an engine coolant temperature sensor, a mass air flow sensor, an idle speed control valve, a manifold absolute pressure sensor, an engine speed sensor, a canister close valve, etc. In a manner which will be described later, each DF module 20, 20', 20" is arranged to evaluate its associated component/sub-system and to generate a diagnostic trouble code (hereinafter referred to as DTC) which indicates the operational fault status of the component/sub-system. In a manner which will also be described later, each DF module 20, 20', 20", is further arranged to calculate the priority with which its associated component/sub-system should be evaluated.

Figure 2:
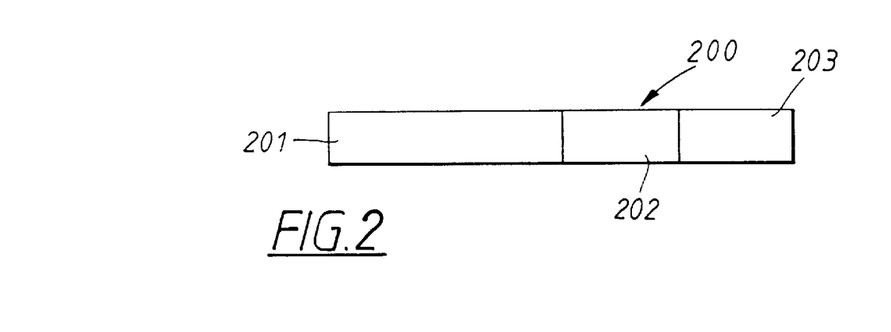
FIG. 2 is a schematic representation of a diagnostic trouble code generated within the diagnostic system according to the present invention.

A preferred DTC format, generally denoted by reference numeral 200, is shown in FIG. 2 and consists of a 16 bit code divided into three parts. A first part 201 preferably consists of 8 bits and serves to indicate within which engine sub-system, for example the ignition system, fuel and air metering system, etc, a fault resides. A second part 202 advantageously consists of 4 bits and serves to indicate within which component of the sub-system a fault resides. Finally, a third part 203, also of 4 bits, is used to indicate the type of fault that has an impact on other components/sub-systems, for example a slow response of an $O_2$ sensor, catalytic converter damage due to misfire, a stuck open valve, etc.

Due to the fact that the engine diagnostic system according to the invention is arranged to evaluate the operational status of a plurality of components and sub-systems, and many of these components/sub-systems can only be evaluated when certain operating conditions are fulfilled, the system 10 further includes a dynamic scheduler 30. The purpose of the scheduler is: to coordinate the execution of the different evaluation routines which are to be run by the respective DF modules, and engine control functions (EC), so that it is ensured that as many evaluation routines as possible can be completed, dependent on the prevailing operating conditions, within a given time interval, at the same time that no two evaluation routines are allowed to take place simultaneously if there is a risk that this may result in an erroneous DTC being generated. An example of two evaluation routines which should not be performed simultaneously is a leakage detection check using a canister purge valve and monitoring of the catalytic conversion ratio.

Since many of the diagnostic functions will cause execution of certain engine functions, the dynamic scheduler is also provided with an interface towards the control functions of the engine, in order to allow or prevent the execution of engine control (EC) functions which would interfer with an engine control function or an evaluation routine which is being executed at the time. One example of an evaluation routine and an engine control function which cannot be allowed to run at the same time is the leakage check test and the canister purge function:

The leakage check test is performed to check whether there are any leaks in the evaporative system of the vehicle. This is done by closing the evaporative system, a procedure which includes shutting all connections leading from the canister. Air is then drained from the system, until the pressure reaches a certain preset level. The leakage check test then monitors the pressure inside the now closed system, to see if the pressure changes, thus indicating the absence or presence of leaks.

The canister purge function is performed in order to rid the canister of fuel which cannot be used, and which would thus be released into the atmosphere, causing unwanted emissions. The canister is purged by introducing ambient air into the engine, through the canister. Thus, any fuel remaining in the canister will be used in the engine, together with the ambient air which was used to "cleanse" the canister. Obviously, this engine control function cannot be performed at the same time as the above described leakage test function.

Naturally, there are many other such combinations of evaluations and engine control (EC) functions which would "collide" with each other.

Thus, the dynamic scheduler 30 can be said to have both an "inhibition due to fault" function, and a "collision controller" part.

Furthermore, if a fault is detected by one DF module, the dynamic scheduler serves to stop evaluation routines that would otherwise be affected by the fault, i.e these stopped evaluation routines would otherwise be "deceived" into believing that a fault exists in their systems as well, even though there are no actual faults in these systems.

In the event that such an affected DF module performs its evaluation routine before the evaluation routine on the component/sub-system which possesses the actual fault is performed, then the affected DF module generates a DTC indicating a fault in the component/sub-system associated with that DF module. Accordingly, it is necessary that the diagnostic system 10 has access to sufficient information to be able-to-verify whether the DTC is valid or not. In other words, the system 10 must be able to determine whether the actual fault lies in the component/sub-system evaluated by the DF module which has provided the initial DTC, or whether the DF module has been "deceived" due to a present but not yet detected fault in another component/sub-system.

In order to provide the system 10 with information about vehicle operating conditions prior to the time when the DTC was generated, the system further includes a data collector module 40. In a manner which will be explained later, the data collector module is arranged to handle the creation of freeze frames and extended freeze frames. A freeze frame is a sample of a number of parameters which are specific for the actual DTC, such as the actual engine temperature and engine sped at the time the DTC was generated. An extended freeze frame contains a number of samples of a few parameters specific for the actual DTC from the time when the DTC was generated and backward in time. On the basis of this information, the data collector module 40 generates a DTC-block containing the DTC and this information.

So that any DTC-blocks generated by the data collector module 40 can be stored, the system 10 is provided with a DTC-data area module 50. In a manner to be described later, when the DTC-data area module 50 receives a request from the data collector module 40 to save a DTC-block, it saves the block and sends a DTC-Saved response to the data collector module.

To determine whether the saved DTC-block is valid or not, i.e. if a fault actually exists or not in the component/sub-system checked by the DF module which generated the DTC, the system 10 is provided with a validator 60. The validator 60 receives the information that a not-validated DTC-block has been saved from the DTC-data area module 50 and, by setting up a validator checklist (to be described), it is able to decide if the DTC-block is to be considered to be valid or not.

If the validator 60 decides that a DTC-block is valid, then this implies that a component or system is malfunctioning. Depending on which component or system is affected, it may be desirable to inform the driver of the vehicle of the malfunction. Accordingly, the system 10 is provided with a malfunction indication lamp (hereinafter referred to as MIL) handler module 70 which can inform the driver of a malfunction by displaying an error sign or message on the dashboard of the vehicle.

To permit the engine diagnostic system 10 to be able to communicate with external testers used by workshops, the system 10 advantageously includes an external communication handler (hereinafter referred to as ECH) module 80.

Finally, the system 10 is provided with a diagnostic system manager (hereinafter referred to as DSM) module 90 which is responsible for the starting of the diagnostic system once the ignition of the vehicle is turned on and for the stopping of the system when the engine control system has finished all other operations after the ignition has been turned off. This is accomplished by an interaction with both the diagnostic system and the engine control system, both situated within the engine control module of the vehicle.

In order to better understand the functioning of the diagnostic system 10 according to the present invention, each module or unit 20, 30, 40, 50 and 60 will be described in the following in greater detail.

The DF Module 20

As mentioned previously, each DF module 20, 20', 20" serves a component or sub-system whose operating status is to be evaluated. Accordingly, each DF module 20, 20', 20" is arranged to evaluate its associated component/sub-system and to generate a diagnostic trouble code (DTC) which indicates the operational status of the component/system. To achieve this, each DF module needs to be able to process all information needed for the evaluation of a malfunctioning component or sub-system such as a sensor, emission component, EVAP system, etc. Each DF module is also arranged to evaluate the priority with which its associated component/sub-system should be evaluated.

To this end, and as is apparent from FIG. 1, each DF module 20, 20' and 20" comprises a plurality of sub-modules including a DF interface 21, a physical diagnosis (hereinafter referred to as a PD) 22, a DF logger 23, a DF controller 24 and a DTC handler 25.

The DF interface 21 is a DF sub-module which handles transfer of communication from and to DF sub-modules to other modules in the diagnostic system. Since the DTC generated by a particular DF module is unique to that module, the DTC is used as an identifier by other modules in the system for communicating with that particular DF module. Accordingly, the DF interface 21 is able to recognize all signals addressed to a DF module with the identifier that is related to the DF module in which the DF interface is located and assigns these signals to the correct DF sub-module. All signals sent from a DF sub-module to the dynamic scheduler 30, the data collector 40, the DTC-data area 50, the validator 60, the MIL handler 70 or the ECH module 80 are transferred via the DF interface 21.

The PD 22 is a DF sub-module which contains an evaluation routine for each DTC that is related to the particular DF module. The PD 22 is able to recognise when the engine operating conditions are fulfilled which will allow the DF-module to evaluate its associated sub-system or component. Each time these conditions are met, the PD 22 informs the DF controller 24 that it is possible to perform the evaluation routine. The PD waits for the DF controller to give permission before executing the evaluation routine.

If, during an evaluation routine, the engine operating conditions change such that the conditions no longer coincide with those which are necessary to be able to perform the evaluation routine, the PD interrupts the routine. Similarly, if the DF controller 24 withdraws the permission to execute the evaluation routine, the PD interrupts the routine.

In order to ascertain whether a possible fault is present, every time an evaluation routine is completed, the PD 22 produces a ranking value as an indicator of the status of the checked component/sub-system. Preferably, each ranking value lies in the range from 1 to 255, with the value 128 corresponding to a normal component or sub-system, for example the idle air adaptation value equal to a calibrated reference. The value 255 corresponds to a component or sub-system that is not working at all, for example the idle air adaptation value at maximum. Each component/sub-system is assigned a high fault limit and providing that the ranking value lies below the high limit, no fault will be indicated and an evaluated "no-fault" data signal is generated. Should the ranking value exceed the high limit, an evaluated "fault" data signal is generated. Each time the evaluation routine is completed, the evaluated data signal is sent to the DF controller 24 and the ranking value is sent to the DF logger 23.

The DF logger 23 is a DF sub-module that receives the ranking values and uses the highest of a specific number of ranking values to be processed statistically and the results are stored for use as information for the workshop.

The DF controller 24 is a DF sub-module that controls the PD 22. Thus, when the PD informs the DF controller that it is possible to run the evaluation routine, a response is sent to the dynamic scheduler that the evaluation routine is inhibited, along with information regarding the priority of that evaluation routine. When/if the dynamic scheduler 30 sends a response that the evaluation routine may be performed, the DF controller 24 permits the PD to run the routine. If the dynamic scheduler 30 sends a request to inhibit the evaluation routine, the DF controller withdraws the permission to run the evaluation routine and when the evaluation routine has stopped, it sends an "inhibited" response to the dynamic scheduler.

The DF controller 24 also receives all evaluated data signals and informs the dynamic scheduler 30 of any change in status of the evaluated data signals defined as the latest evaluated data signal. The DF controller demands a consecutive number of evaluated "fault" data signals to be generated before it produces a controlled "fault" data signal. The actual number of consecutive signals required to bring about this change in condition is specific for each DTC that is to be generated. At ignition, the controlled data signal is set to "not-done" and at the first evaluated "no-fault" data signal, the controlled data signal is set to "no-fault".

Once the DF controller 24 produces a controlled "fault" data signal, it sends a request to the data collector module 40 to create DTC data. Once set, it is not possible to change the controlled "fault" data signal for the remainder of the driving cycle (until ignition off).

As mentioned above, the DF controller 24 also calculates the priority with which the evaluation routine associated with that particular DF module should be executed. This priority is communicated to the dynamic scheduler 30. In a preferred embodiment, the priority calculation is based on when the evaluation routine associated with that particular DF module was last executed. In a particular embodiment, the evaluation routines are preferably arranged into four groups, in order of priority:

1) Evaluation functions which have not been executed during the present or the previous driving cycle.
2) Evaluation functions which have not been executed during the present driving cycle, but which were executed during the previous driving cycle.
3) Evaluation functions which have been executed during the present driving cycle, but not during the previous driving cycle.
4) Evaluation functions which have been executed both during the present driving cycle and the previous driving cycle.

There are two further levels of priority, both of which are higher than the four above-mentioned levels. These two levels are the so called "certification window" level, and the "swift test" level. Of these two, the "swift test" level has the higher priority, i.e. the "swift test" priorirty level is the highest of all the priority levels.

The "certification window" priority level serves to ensure that the evaluation function is performed during a specified "window" in time. This window is usually a period of time, specified e.g. by legislation, during which the function in question must be evaluated.

The swift test level is used e.g. in a workshop, after repairs have been carried out on the sub-system/component in question, in order to swiftly ascertain whether the repairs have been successful.

The DTC handler 25 is a DF sub-module that is responsible for taking decisions after the diagnostic system 10 has validated a DTC-block as being valid. Its functions include deciding when to store the DTC-block permanently, sending a request to illuminate or extinguish the malfunction indication lamp in the MIL handler module 70 and deciding when to erase the DTC-block if the fault is no longer detected.

Dynamic Scheduler Module 30

The dynamic scheduler module 30 handles the scheduling of evaluation routines and engine control (EC) functions.

The dynamic scheduler module 30 receives requests to run engine control (EC) functions, and also receives requests from the DF modules 20, 20', 20" to execute evaluation routines, and decides which of these engine control (EC) functions and evaluation routines should be performed, and in which order, taking into account:
    whether any evaluated "fault" data signals are present,
    the priority of the evaluation routines which have been requested,
    the priority of the engine control functions which have requested to execute,
    undesired "collisions" between engine control (EC) functions and evaluation routines, and
    whether the operating conditions necessary for that particular engine control function or evaluation routine are fulfilled.

The dynamic scheduler module 30 takes into account any latest evaluated data which it receives from the DF modules and decides whether this evaluated data implies that certain evaluation routines and/or engine control functions affected by the fault should be inhibited. The dynamic scheduler may also take into account whether a DF module informs the dynamic scheduler module that an evaluation routine has been stopped because the conditions for running the evaluation routine are no longer fulfilled, or inhibited on request from the dynamic scheduler or due to dynamic scheduler not yet having sent the run response.

Figure 3:
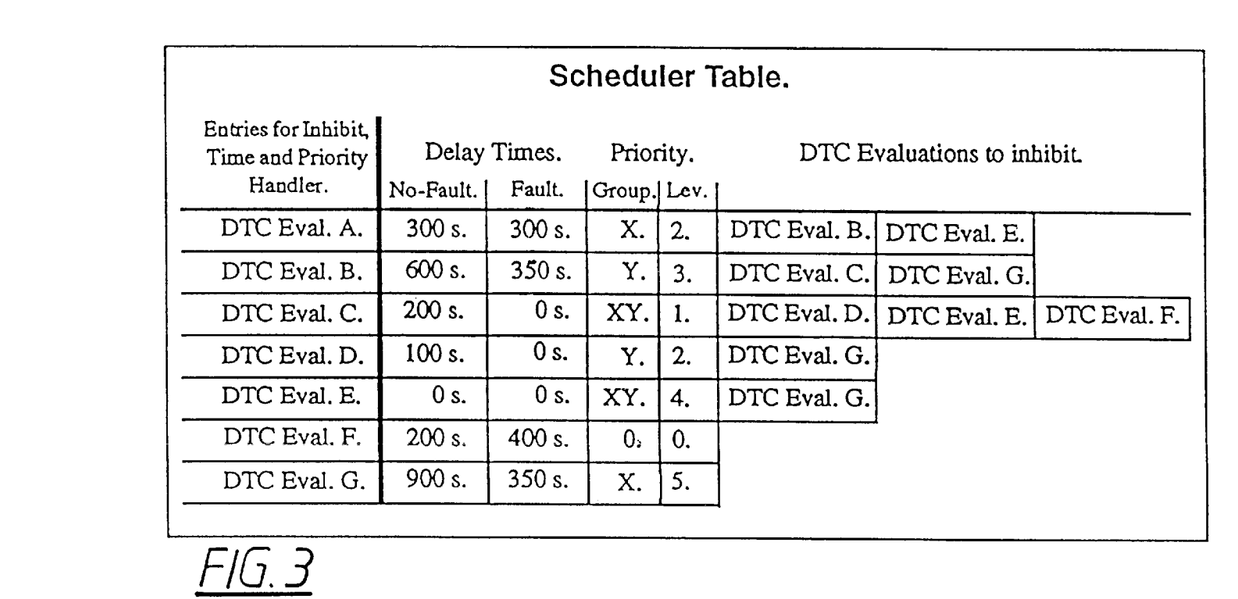
FIG. 3 illustrates a possible scheduler table for use within a scheduler located in the diagnostic system according to the present invention.

In order to fulfil its requirements, the dynamic scheduler module 30 requires access to information relating to what has to be done for each evaluation routine. This information may be contained in a scheduler table. An example of a possible scheduler table is shown in FIG. 3. The scheduler table contains all the evaluation routines for the diagnostic system and preferably specifies:
    the priority level of all evaluation routines dedicated to certain specified priority groups so that the dynamic scheduler module can determine which of the requested to run routines has priority within each priority group, and
    which other evaluation routines to inhibit should the latest evaluated data from a DF module indicate a fault.

Figure 4:
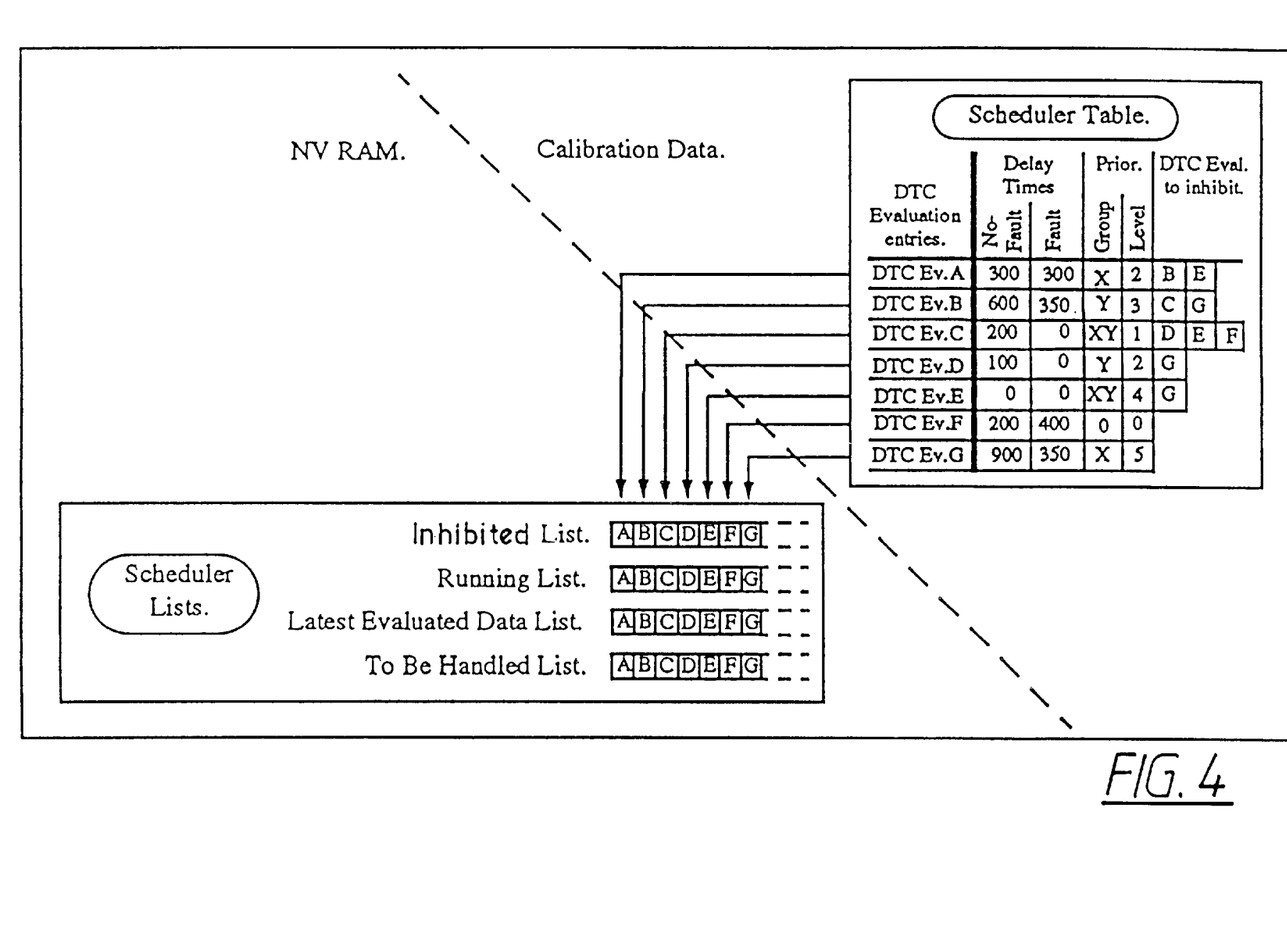
FIG. 4 illustrates a possible scheduler list for use in the diagnostic system according to the present invention.

In order to function effectively, the dynamic scheduler module also needs information concerning the current status of the evaluation routines in the diagnostic system. This information is provided by a scheduler list. With reference to FIG. 4, the scheduler list contains four sub-lists, namely an inhibited list, a running list, a latest evaluated data list and a to-be-handled list.

The inhibited list indicates which evaluation routines have requested the opportunity to run but which are not permitted to run. Flags in this list are set for the evaluation routines that have reported that they are inhibited and reset for the evaluation routines that have indicated that they have ceased due to the physical conditions within the DF module or that have been turned off by the dynamic scheduler module.

The running list, as the name implies, indicates which evaluation routines are presently running. Flags in the running list are set for those evaluation routines which the dynamic scheduler module has allowed to commence running, and reset for the evaluation routines which are reported to be stopped, inhibited or turned off by the related DF modules.

The latest-evaluated-data list indicates the current status of the evaluated data for each evaluation. Flags in this list are set for each evaluation routine that has sent a latest evaluated "fault" data signal, and reset for each evaluation routine that has sent a latest evaluated "no-fault" data signal.

The to-be-handled list is used by the dynamic scheduler module as a working list to keep track of which evaluation routines remain to be handled because of priority, time and evaluated "fault" data signals. Each time the dynamic scheduler has finished processing the priority handler 35, the flags that remain "set" in the to-be-handled list are indications that the associated evaluations should be running, and flags that are "reset" are indications that the associated evaluations should be stopped or inhibited.

In the above, and following, descriptions of the tables of FIGS. 3 and 4, for reasons of simplicity only evaluation routines have been included in the tables. The tables may of course, when necessary and desired, include corresponding data regarding engine control (EC) functions.

To execute the required functions, and as is apparent from FIG. 1, the dynamic scheduler consists of a number of sub-modules including a DFS interface 31, a DFS controller 32, an inhibit handler 33 and a priority handler 35.

All signals that are sent from DF modules 20, 20', 20" and the ECH module 80 to the dynamic scheduler module 30 are identified in the DFS interface 31 and transferred to the correct dynamic scheduler sub-modules. All signals that are sent from the dynamic scheduler sub-modules to the DF modules and the ECH module are transferred via the DFS interface 31.

All signals sent to the dynamic scheduler module 30 are checked by the DFS controller 32. The DFS controller updates the inhibited list, the running list and the latest evaluated data list for signals sent from the DF modules 20, 20', 20" to the dynamic scheduler module 30. If any of the three lists has been updated, the DFS controller 32 acts as follows:

Copy the inhibited list and running list into the to-be-handled list.

Start the inhibit handler 33.

When the inhibit handler 33 is finished, start the priority handler 35.

When the priority handler is finished, perform a "stop routine", i.e. the DFS controller 32 sends inhibit requests to the evaluation routines that are running according to the running list (flags are set) but should not be running according to the to-be-handled list (flags are reset), and sets the flags in the inhibited list as an indication that the dynamic scheduler has requested these evaluations to be inhibited.

When finished with the "stop routine", a "start routine" is performed, i.e. the DFS controller sends a run response to each of the evaluations that should be running according to the to-be-handled list and is each associated to a priority group according to the scheduler table in which no other evaluations are running according to the running list. For each run response sent, the DFS controller sets the corresponding flag in the running list.

When finished, check if there is any signal which has been sent to the dynamic scheduler and if so start to work again.

When a request to stop all evaluation routines is sent from the ECH module 80, the DFS controller 32 acts as follows:

Clear the to-be-handled list and start to work (inhibit requests will be sent to all evaluation routines that are running).

When finished, update the latest evaluated data list, the running list and the inhibited list according to all signals sent to the dynamic scheduler but do not start to work as in normal operation.

When all flags in the running list are reset, send the response that all evaluation routines have been stopped to the ECH module 80.

Wait only for a request to resume normal operation from the ECH module 80.

When the request to resume normal operation is received, copy the to-be-handled list and start to work as normal.

When a request to turn off all evaluation routines is received from the diagnostic system manager (DSM) module 90, the DFS controller 32 acts as follows:

Send turn off requests to all evaluation routines.

Update the latest evaluated data list, the running list and the requested-to-run list according to all signals sent to the dynamic scheduler.

When all flags in the running list and inhibited list are reset, send a response to the DSM module 90 that all evaluation routines have been turned off.

Wait only for a general response signal from the DSM module 90 to start the diagnostic system 10 before starting to work as normal again. No action while waiting.

The inhibit handler 33 acts only on a start request received from the DFS controller 32. The inhibit handler 33 first checks the latest evaluated data list to determine which evaluation routines have generated latest evaluated "fault" data signals. For those evaluation routines which have generated such signals, the inhibit handler 33 checks the scheduler table (FIG. 3) to determine which evaluation routines to inhibit due to reported faults. The inhibit handler 33 resets the flags in the to-be-handled list that correspond to the evaluation routines to be inhibited. When finished, the inhibit handler sends a "finished" signal to the DFS controller 32.

The priority handler 35 acts only on a request to start from the DFS controller 32. The priority handler checks the to-be-handled list to ascertain which evaluation routines are to be handled. Using this list and the scheduler table, the priority handler 35 is able to determine which of the evaluation routines to be handled are in the same priority group, starting with priority group number 1 in the scheduler table (e.g. X) (FIG. 3). The priority handler resets the corresponding flag in the to-be-handled list for the evaluation routines that have lower priority levels than the evaluation routine that is to be handled and which has the highest priority level within the priority group.

When finished with the first priority group, the priority handler 35 continues with priority group number 2 (e.g. Y) and so on until all priority groups have been checked.

If an evaluation routine is assigned more than one priority group, it is handled as a part of each priority group. The priority level is then used individually in each priority group.

Since the dynamic scheduler module (30) has an interface towards the engine control (EC) functions of the vehicle, the function of those calculation routines in the engine control functions which communicate with the dynamic scheduler module (30) will be briefly described in the following:

For each of the engine functions concerned, a priority value is calculated. This calculation takes into account:

the period of time refered to above as "certification window"

whether the conditions necessary for carrying out the engine control function in question are fulfilled the priority level refered to above as "swift test"

Since the priority levels calculated by two or more engine control functions or evaluation routines may be equal, each caluation routine or engine control function is given a so called "static priority". If two or more calculated priorities are equal, a total priority is calculated, the total priority being the sum of the calculated and the static priorities.

The Data Collector Module 40

On request from a DF module 20, 20', 20" to create DTC-data, the data collector module 40 is arranged to perform the following functions:

Create a freeze frame (hereinafter referred to as FRZF) with DTC specific data.

Combine the FRZF with certain information to form a DTC-block.

Create an extended FRZF (measurement over time) with DTC specific data.

Send the DTC-data (DTC-block and extended FRZF) to the DTC data area module 50.

Advantageously, the data collector module 40 can also act as an internal flight recorder on request from the ECH module 80.

Figure 5:
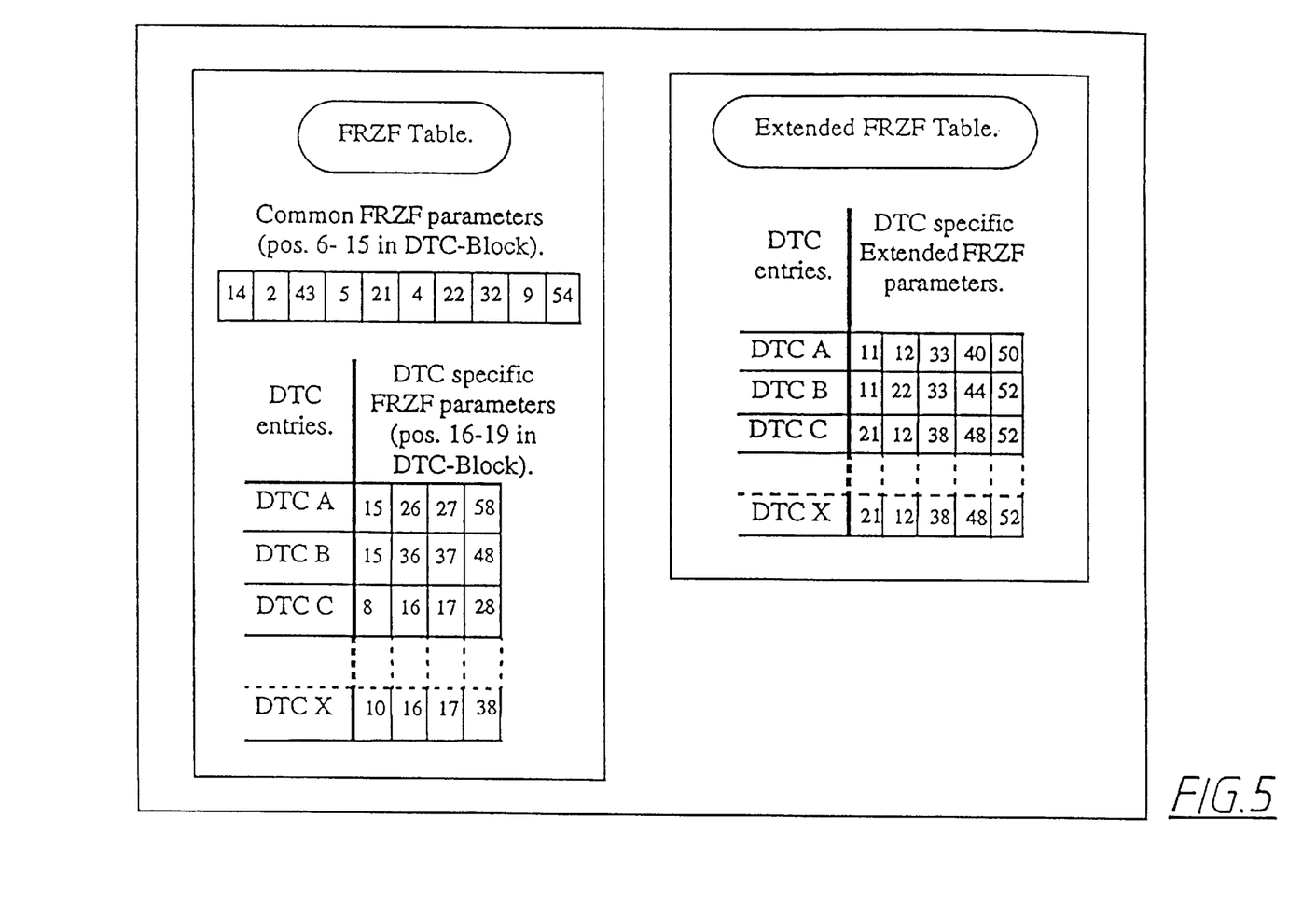
FIG. 5 illustrates a possible freeze frame table and extended freeze frame table for use within a DTC-data area located in the diagnostic system according to the present invention.

In order to fulfil these requirements, the data collector module 40 requires information concerning the specific parameters for each evaluation routine which is performed in the DF modules 20, 20', 20". This information is provided in a FRZF table and an extended FRZF table. An example of a FRZF table and an extended FRZF table is shown in FIG. 5. Each number in the tables denotes a particular parameter.

Figure 6:
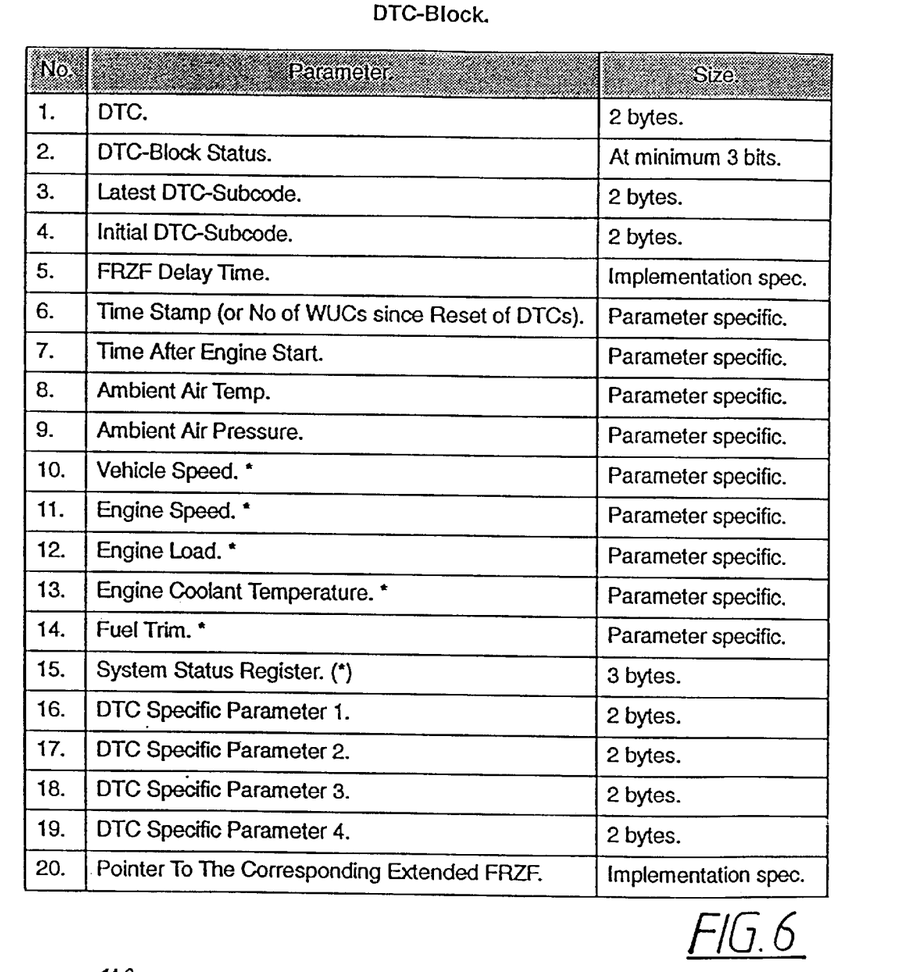
FIG. 6 illustrates an example of a DTC-block for use in the diagnostic system according to the present invention.

As mentioned above, the data collector module 40 generates a DTC-block. A DTC-block is a data block that contains information in the form of parameters pertaining to the operating conditions at the time that the DTC was generated. An example of a possible DTC-block is illustrated in FIG. 6. Thus, the DTC-block consists of certain DTC specific information (DTC, latest and initial DTC-subcode and FRZF delay time) together with the FRZF and finally a pointer to the extended FRZF.

Figure 7:
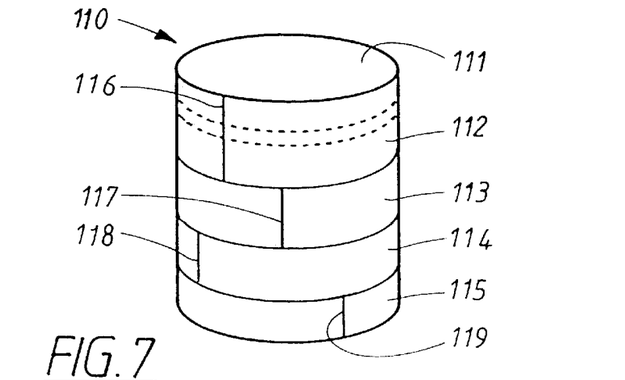
FIG. 7 is a schematic representation of a rotating buffer for use within a data collector located in the diagnostic system according to the present invention.

To be able to create an extended FRZF, which is a measurement over time of DTC relevant data, the data collector module 40 is provided with a circular memory in the form of a rotating buffer. As shown in FIG. 7, the rotating buffer is generally denoted by reference numeral 110 and is in the form of a drum 111 divided into, in the illustrated example, four different time bases 112, 113, 114, 115 resp.

Figure 8:
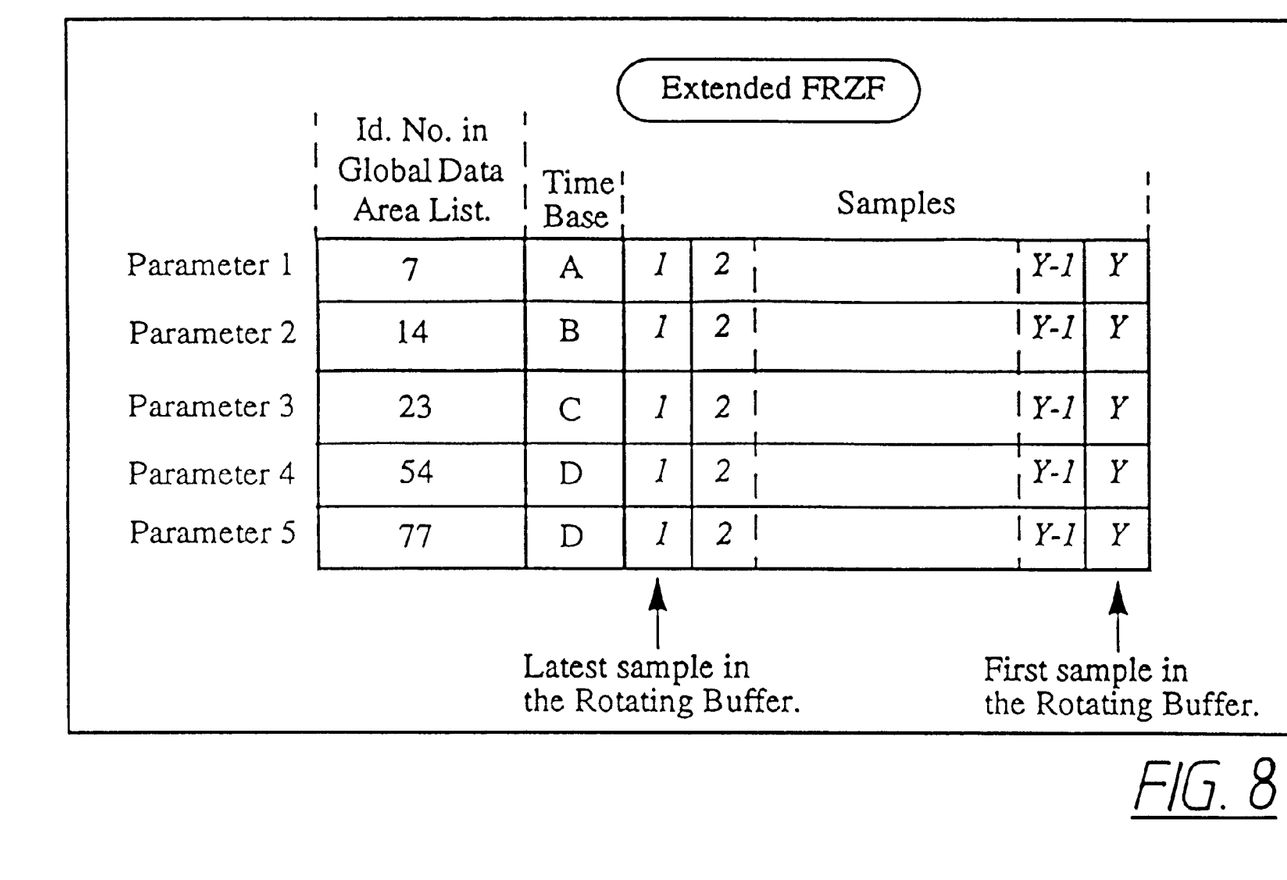
FIG. 8 is an example of an extended freeze frame.

An example of an extended freeze frame is shown in FIG. 8.

A global data area, denoted by reference number 120 in FIG. 1, is positioned externally of the diagnostic system 10 in the engine control system part of the engine control module and contains current information on values for all parameters for all evaluation routines. Each parameter is identifiable by a unique identification number in the global data area 120 and is allocated one of the time bases 112, 113, 114, 115. The rotating buffer 110 is updated each time any time base expires with parameter values associated with the expired time base copied over from the global data area 120 and these parameters are stored in their respective time base. A pointer 116, 117, 118, 119 to indicate the latest sample to be copied over is placed in front of the latest sample in each time base. When a time base of the rotating buffer 110 is full, the oldest sample is written over in that time base. In this manner, the rotating buffer 110 forms a circular memory with several time bases, each with equal memory depth but with specific time depth.

In order to generate DTC-data which will subsequently be forwarded to the DTC data area module 50 and to handle requests sent from the ECH module, the function of the data collector module 40 is divided into sub-modules, i.e a DC interface 41, DC controller 42, FRZF collector 43, extended FRZF collector 44 and a buffer handler 45.

All signals that are sent from the DF modules 20, 20', 20" and the ECH module 80 to the data collector module 40 are identified by the DC interface 41 and transferred to the correct data collector sub-modules. All signals sent from the data collector sub-modules to the DTC data area module 50 and the ECH module 80 are transferred via the DC interface 41.

Upon receipt of a request from a DF module 20, 20', 20" to create DTC-data, the DC controller 42 requests the FRZF collector 43 to create a FRZF. Upon receipt of this request, the FRZF collector 43 checks the FRZF table (FIG. 5) to determine which parameters specific for this DTC are to be copied over from the global data area 120. The FRZF collector proceeds to copy the parameters from the global data area and places them in the order specified by the FRZF table. When finished, the FRZF collector informs the DC controller 42 that the FRZF has been created.

When the FRZF collector 43 has informed the DC controller 42 that the FRZF has been created, the DC controller asks the extended FRZF collector 44 to create an extended FRZF.

Upon receipt of this request, the extended FRZF collector 44 performs the following acts:

Stop the rotating buffer by sending a stop request to the buffer handler 45.

Create an empty extended FRZF of correct size, the empty extended FRZF including parameter identification numbers specified by the extended FRZF table.

Upon receipt of confirmation that the rotating buffer has been stopped, copy over all the parameter values corresponding to the identification numbers in the extended FRZF that match the identification numbers specified in the rotating buffer table from the rotating buffer.

Start the rotating buffer by sending a start request to the buffer handler 45.

Send a response to the DC controller 42 that the extended FRZF has been created.

Using i.a. information provided in the FRZF and the extended FRZF, the DC controller 42 creates DTC-data in the form of a DTC-block (see FIG. 6) modified to take account of the extended FRZF.

Once the DTC-data has been created, the DC controller 42 sends a request to the DTC-data area module 50 to save the DTC data.

After sending the request, the DC controller 42 waits for confirmation from the DTC-data area module that the DTCWO data has been saved before acting on any new request to create DTC-data.

The DTC-data Area Module 50

The DTC-data area module 50 is divided into four sub-modules, namely a DA interface 51, a DTC-block area 52, an extended FRZF area 53 and a DA controller 54.

All signals that are sent to the DTC-data area module 50 from the ECH module 80, the data collector module 40, the validator 60 and the DF modules 20, 20', 20" are identified by the DA interface 51 and transferred to the correct DTC-data area sub-module. All signals sent from the DTC-data area sub-modules to the validator 60 and the data collector module 40 are transferred via the DA interface 51.

The DTC-block area 52 is used for storing the DTC-blocks. The number of DTC-blocks which can be stored in this area varies from application to application, but a typical number is ten. The DTC-block area 52 is always capable of storing a predetermined maximum number of DTC-blocks plus one. The additional one represents a temporary space which is used to buffer the incoming data from the data collector module 40. The DTC-block area 52 uses a free list to keep track of the free DTC-blocks, and a temporary pointer to keep track of the temporary space.

The extended FRZF area 53 is used for the storage of the extended FRZFs. The extended FRZF area 53 is always capable of storing a predetermined maximum number of extended FRZFs plus one. The additional one represents a temporary space which is used to buffer the incoming data from the data collector module 40. The extended FRZF area 53 uses a free list to keep track of the free extended FRZFS, and a temporary pointer to keep track of the temporary space.

The DA controller 54 controls the DTC-block 52 and the extended FRZF area 53. It receives a DTC-block and an extended FRZF via the DA interface 51 from the data collector module 40 and the DTC-block and extended FRZF are saved in the applicable data areas.

When the DA controller 54 receives a request from the data collector module 40 to save DTC-data, the DA controller saves the DTC-block and associated extended FRZF and, when this is done, informs the validator module 60 that a not-validated DTC-block has been saved and waits for an acknowledge response or any request from the validator. If the validator sends an acknowledge response, the DA controller informs the data collector module 40 that the DTC-data has been saved.

If the related DF module sends an acknowledge response, the DA controller informs the data collector module 40 that the DTC-data has been saved.

When requested by the validator module 60 to change a DTC-block status from not-validated to valid, or to erase a not-validated or valid DTC-block, the DA controller 54 does so and informs the related DF module if a valid DTC-block has been erased and waits for an acknowledge response or any request from the related DF module.

When requested by a DF module to change a DTC-block status from valid to stored, or to erase a valid or stored DTC-block, the DA controller does so and informs the validator module 60 that a valid or stored DTC-block has been stored or erased.

If, after sending a response that the DTC-data has been saved, the available space is not enough for the next DTC-block, i.e. no temporary space is free, the DA controller 54 erases the DTC-block and associated extended FRZF having lowest priority and informs the validator module 60 and related DF module 20, 20', 20'' that the particular DTC-block has been erased. If there is only not enough space for the next extended FRZF, the DA controller erases the extended FRZF having lowest priority and erases the link between the erased extended FRZF and the associated DTC-block but does not send any information about the event.

At the request to erase all DTCs sent from the ECH module 80, the DA controller 54 erases all DTC-blocks and, for each DTC-block erased, it informs the validator 60 and related DF module.

The Validator Module 60

The purpose of the validator module 60 is to determine the root cause of a fault. In other words, it is possible that, say, four DTC-blocks with extended FRZFs are generated by the data collector module 40, though in fact only one of the DTC-blocks is the true indicator of the fault. This is because the fault is deceiving the other affected evaluation routines so that erroneous controlled "fault" signals are sent from the affected DF modules to the data collector module 40. The validator therefore examines each of the four DTC-blocks (with associated extended FRZFs) to determine in which component or system the actual fault lies.

Thus, when the validator module 60 is informed by the DTC-data area module 50 that a saved DTC-block is present, the validator sets up a checklist that contains all possible root cause evaluation routines that have to be performed and reported with controlled data as "no fault" before validating the correct DTC, i.e pointing out the DTC-block that is the root cause of the fault. The content of the validator checklist is stored at ignition of f, i.e. the validation is independent of ignition on/off.

Figure 9:
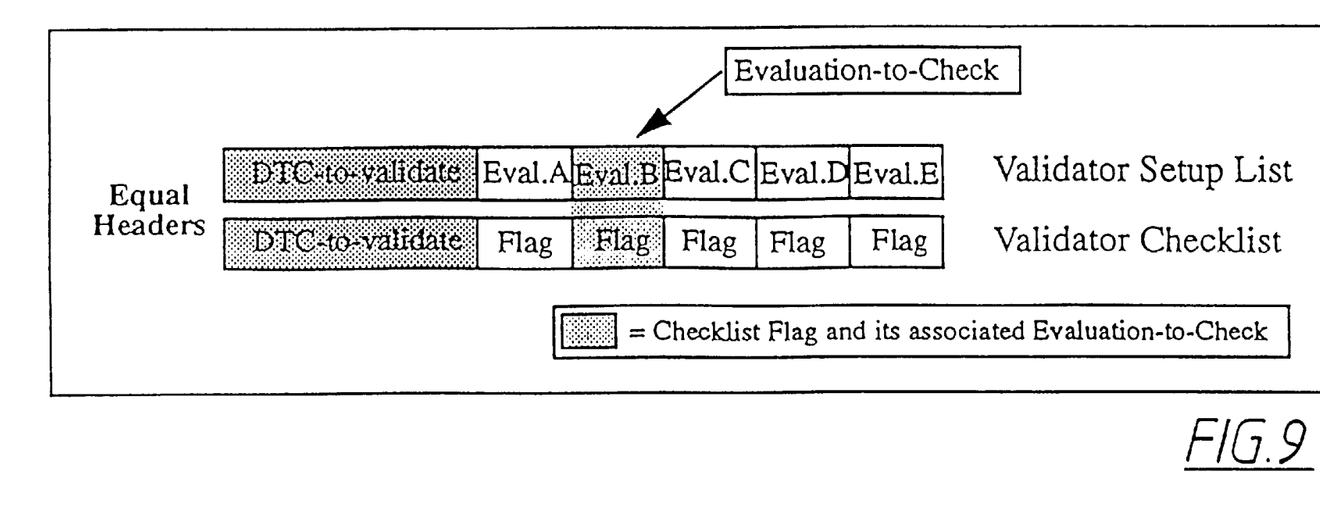
FIG. 9 illustrates a validator setup list and corresponding validator checklist.

Validator setup-lists are used to set up and initiate checklists. Each setup-list contains the DTC-to-validate and a specification of which evaluations have to be checked before validation of the DTC-to-validate. A validator setup list and corresponding validator checklist is illustrated in FIG. 9.

A checklist is set up according to its set-up list in the following manner.

When the validator module 60 is informed by the DTC-data area module 50 that a DTC-block has been saved, the validator module searches the setup-lists for a DTC-to-validate that corresponds to the DTC in the DTC-block. If the DTC is not found in any of the DTC-to-validate positions in any of the setup-lists, the validator immediately makes the DTC-block valid by requesting the DTC-data area module 50 to change status on the DTC-block from not validated to valid.

If the DTC is found, the validator setup-list containing the matching DTC-to-validate is used to set up a validator checklist specific for this DTC. The checklist comprises the following items:

A header specifying the DTC being validated (this links the checklist to its setup-list).

A time stamp (elapsed realtime read from the global data area 120).

Flags indicating the status for each evaluation-to-check in the validator setup list, a flag being set for controlled no-fault and reset as long as controlled no-fault has not been reported. The evaluation-to-check linked to each flag is defined in the setup-list.

A validator setup list that has a validator checklist linked to it is, in the following, termed an active validator setup-list.

The validator checklists are updated only on request sent from the DSM module 90 at the end of each driving cycle. In the update procedure, the validator module requests controlled data from each DF module 20, 20', 20'' defined in the active validator setup-list. Each DF-module responds with its current controlled data state, i.e. not controlled, controlled fault or controlled no-fault. The response "controlled no-fault" sets a corresponding flag in the validator checklist. The responses "not controlled" and "controlled fault" reset the corresponding flag in the checklist.

When all the flags in the validator checklist are set, the DTC-block associated with the DTC-to-validate is decided to be valid and the validator module 60 sends a signal to the DTC-data area module requesting a change of the DTC-block status from not-validated to valid. The DTC-data area module 50 changes the status and then sends a signal to the applicable DF module that a DTC-block status has changed to valid.

Figure 10:
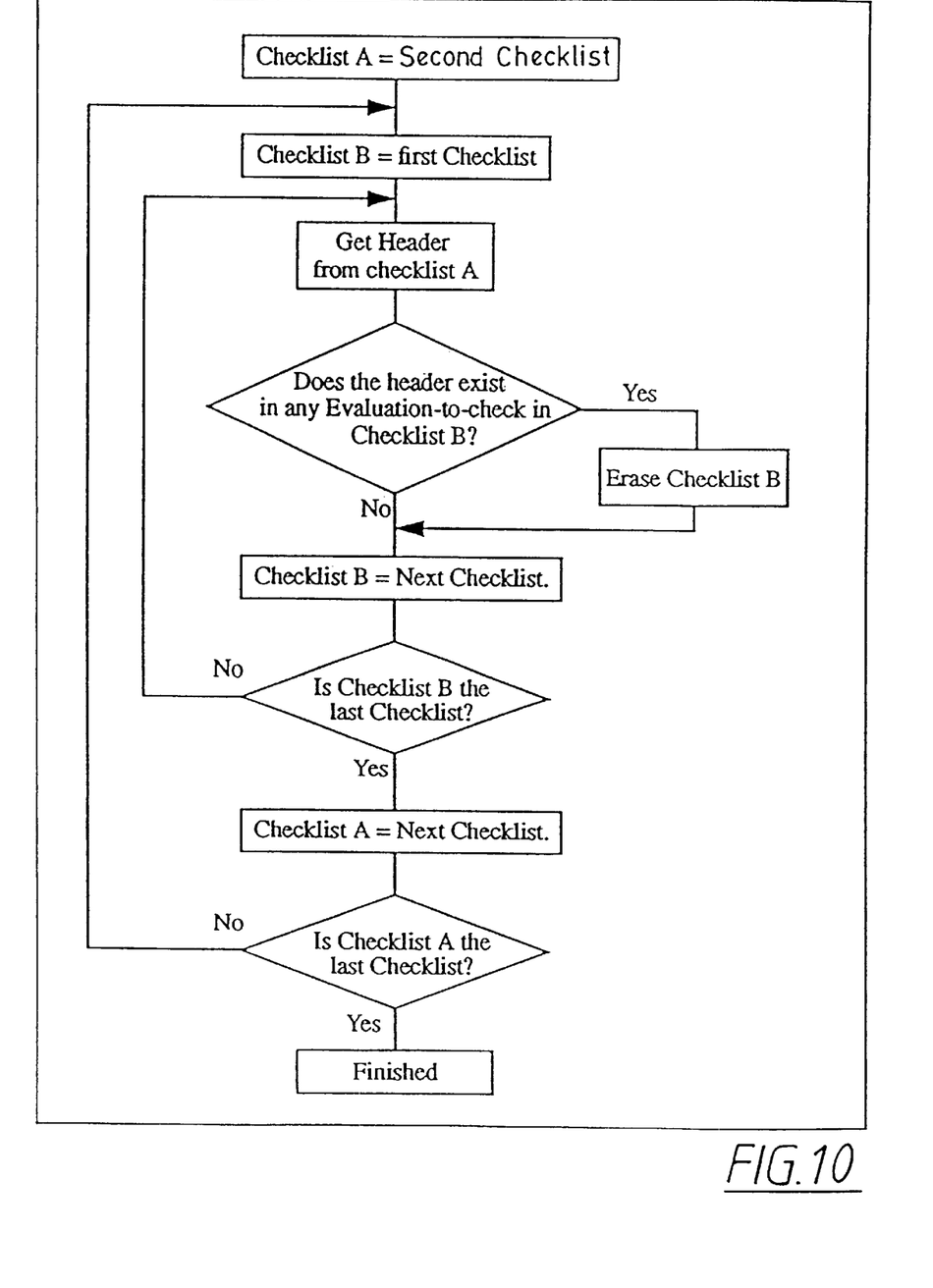
FIG. 10 illustrates a flowchart for initialization of a validator checklist.

As illustrated in FIG. 10, when the validator module 60 receives a second not-validated DTC-block saved signal (Checklist A) from the DTC-data area module that corresponds to an evaluation-to-check in an active validator setup-list with associated validator checklist (Checklist B), the DTC-block that generated that active validator checklist is not considered to be the root cause. Such DTC-block and validator checklist (Checklist B) are therefore erased. This is achieved by sending a signal to the DTC-data area module requesting the DTC-block relating to the header in the validator checklist to be erased. Upon the response that the DTC-block has been erased, the validator erases the related validator checklist. A new validator checklist is set up for the other DTC-block that caused these events.

When the validator module 60 receives a signal from the DTC-data area module 50 that a DTC-block status has been changed from valid to stored, the corresponding validator checklist is erased.

To ensure the relevance of the information in the validator module 60, a validator checklist reset function is implemented. The reset function resets all the flags when the validator checklist is older than a predetermined period of time, for example at least 168 hours.

Overall Normal Operation of the Diagnostic System 10 When No Fault is Present The overall normal operation to run the different evaluations with correct system (i.e. no fault) is described below:

At the signal to start the diagnostic system sent from the DSM module 90, each DF module will, as soon as the physical conditions are fulfilled for running its evaluation, send the priority of its associated evaluation to the dynamic scheduler module 30. The dynamic scheduler 30 will also receive requests to run from a plurality of engine functions.

When the dynamic scheduler module receives this information, it establishes the order of execution for the evaluations and the engine control functions and sends run responses to the engine control functions and related DF modules that contain evaluations that are permitted to run.

The DF modules and engine control (EC) function that receive run responses from the dynamic scheduler module will now run/execute. The evaluated data from the DF modules is used to determine whether or not there is a fault present in the checked component/sub-system and also to decide whether or not DTC-data is to be created.

If an evaluation routine is interrupted due to changes in its physical conditions (e.g. engine speed), or e.g. is finished for the rest of the driving cycle, the related DF module takes this into account when calculating the priority of that-evaluation routine.

When the dynamic scheduler module receives a response that an evaluation or engine control function has been stopped, the dynamic scheduler module establishes the order of priority for the evaluations that are inhibited due to priority in addition to the evaluations that are still running and, if permitted, sends run responses to the related DF modules that contain evaluations that are now no longer to be inhibited due to priority. This is repeated until the DSM module 90 sends a request signal to turn off all evaluations, i.e. to stop the diagnostic system. Requests to run from engine control functions which are not running are handled in a similar manner.

This completes the overall normal operation for the diagnostic system when no fault is present.

Overall Normal Operation When One or More Faults are Present in the Diagnostic System The overall normal operation to inhibit affected evaluations and to store the correct DTC (together with MIL illumination) in the diagnostic system 10 with one or several faults present is described in the following:

If, during the overall operation described above for when no fault is present, an evaluation routine in a DF module detects a fault and generates evaluated data as "fault", then the related DF module sends latest evaluated data as "fault" to the dynamic scheduler module 30.

When the dynamic scheduler module receives a latest evaluated data as "fault", it firstly inhibits the evaluations that are affected by this fault and then establishes an order of priority between the remaining evaluations that are not affected by the fault, i.e. the evaluations that are inhibited due to priority a well as the evaluations that are running.

If another evaluation receives a latest evaluated data as "fault", the dynamic scheduler module 30 inhibits the evaluations affected by this other evaluation and so on for every-evaluation that reports a latest evaluated data as "fault".

When a specific filtering of the evaluated data as "faults" is completed, the controlled data is set to "fault" in the related DF module for the remainder of the driving cycle. Immediately the controlled data is set to "fault", the related DF module sends a request to create DTC-data to the data collector module 40.

Upon the request to create DTC-data, the data collector module 40 creates a DTC-block together with an extended FRZF and, when finished, sends a request to save this DTC-data (with the status "not validated") to the DTC-data area module 50.

On the request to save the DTC-data, the DTC-data area module saves the DTC-block together with the extended FRZF and, when finished, sends information to the validator module 60 that a not-validated DTC-block has been saved, and then sends the response that the DTC-block has been saved to the data collector module 40.

When the validator module 60 receives the information concerning the saved DTC-block from the DTC-data area module 50, it sets up a validator checklist that contains all the evaluations that are needed to, on request, respond that they have their controlled data as no-fault to the validator module before the validator module decides that the DTC-block is valid.

The validator checklist is updated at the end of each driving cycle on request sent from the DSM module.

When the checklist is completed and the DTC-block is decided to be valid, the validator module validates the not-validated DTC-block by sending a request to change the DTC-block status from not-validated to valid to the DTC-data area module 50.

On request to change DTC-block status from not-validated to valid, sent from the validator module 60, the DTC-data area module 50 changes the DTC-block status from not-validated to valid and, when finished, sends the information that the DTC-block is valid to the related DF module.

When the DF module receives the information that a related DTC-block has the status "valid", the DF module initiates and controls a DTC store process and, when completed, sends a request to change the DTC-block status from valid to stored to the DTC-data area module 50.

When the DTC-data area module receives the request to change DTC-block status from valid to stored from the related DF module, the DTC-data area module changes the DTC-block status from valid to stored and then sends the information signal that the DTC-block has changed status to stored to the validator module 60.

When the validator module receives the information that a DTC-block has changed status to stored, it erases the related checklist.

When the DF module receives the information that the related DTC-block has the status stored in the DTC-data area module, it will, in applicable cases, send a request to the MIL handler module 70 to illuminate the MIL.

When the MIL handler module receives the request to illuminate the MIL from the DF module, it illuminates the MIL.

The above-described creation, saving and status changing of DTC-data will also be performed if another DF module sends another request to create DTC-data. However, handling of the current DTC-data is completed before handling of the next one, and so on for every DF module in the diagnostic system. In other words, once the DTC-data area module has received an acknowledge signal from the validator module or, if the current DTC-block status has changed to valid, an acknowledge signal from the current DF module, the DTC-data area module will handle any new request to save DTC-data.

If the DTC-data area module reports that a further new not-validated DTC-block has been saved, the validator module 60 checks whether the corresponding evaluation to this new DTC-block is to be found as an evaluation to be checked in the current checklist. If so, then the current checklist and associated DTC-block are no longer the possible root cause to the fault and the validator module sends a request to the data area module to erase the current DTC-block and then sets up another checklist for the new DTC-block and so on until any DTC-block status is changed to stored in the DTC-data area module 50.

If a DTC-block status has been changed to stored, the validator module erases the associated checklist.

This completes the overall normal operation to inhibit affected evaluations and to store the correct DTC, together with MIL illumination, in the diagnostic system 10 with one or several fault-present.

The present invention is not restricted to the embodiments described above and shown in the drawings, but may be varied within the scope of the appended claims.

What is claimed is:

1. A diagnostic system in an engine management system for generating a diagnostic trouble code (DTC) to indicate the operational status of a component or sub-system which is being evaluated by said diagnostic system, said diagnostic system comprising:

a diagnostic function module (DF module) for each DTC or a group of related DTCs, said DF module including means (22) for executing an evaluation routine to evaluate the operational status of a component or sub-system to which the DTC of the specific DF module relates, and a dynamic scheduler for determining which evaluation routine associated with said DF module may be allowed to execute at a particular time;

wherein each said DF module comprises means for determining the priority with which the evaluation routine associated with that DF module should be executed.

2. The diagnostic system of claim 1, further comprising:

means for producing a ranking value dependent on the operating status of the component or sub-system being evaluated, said ranking value being generated each time an evaluation routine is performed;

means for processing and storing statistical results of the ranking values obtained over a number of evaluation routines;

means for evaluating said statistical results to produce evaluated data in the form of either an evaluated no-fault signal or an evaluated fault signal, and means for transmitting said evaluated signals to said dynamic scheduler when a change in said signals occurs.

3. The system as claimed in claim 1, wherein said dynamic scheduler (30) comprises means responsive to an evaluated fault signal to prevent other DF modules from performing evaluations if said other DF modules may be affected by said evaluated fault signal.

4. A diagnostic system in an engine management system for generating a diagnostic trouble code (DTC) to indicate the operational status of a component or sub-system which is being evaluated by said diagnostic system, said diagnostic system comprising:

a diagnostic function module (DF module) for each DTC or a group of related DTCS, said DF module including means for executing an evaluation routine to evaluate the operational status of a component or sub-system to which the DTC of the specific DF module relates, and a dynamic scheduler for determining which evaluation routine associated with said DF module may be allowed to execute at a particular time;

wherein each said DF module comprises means for determining the priority with which the evaluation routine associated with that DF module should be executed;

wherein said dynamic scheduler comprises means, responsive to signals from engine control functions and DF modules, for preventing other execution of engine control functions or evaluations by DF modules if the other engine control functions or the evaluations by DF modules interfere with a currently-performance control function or a currently performed evaluation by a DF module.

5. A diagnostic system as claimed in claim 1, in an engine management system for generating a diagnostic trouble code (DTC) to indicate the operational status of a component or sub-system which is being evaluated by said diagnostic system, said diagnostic system comprising:

a diagnostic function module (DF module) for each DTC or a group of related DTCs, said DF module including means for executing an evaluation routine to evaluate the operational status of a component or sub-system to which the DTC of the specific DF module relates, and a dynamic scheduler for determining which evaluation routine associated with said DF module may be allowed to execute at a particular time;

wherein each DF module comprises means for determining the priority with which the evaluation routine associated with that DF module should be executed;

wherein said means for determining the priority with which the associated evaluation routine should be executed comprises a calculation based on when the evaluation routine associated with that DF module was last executed.

6. A diagnostic function (DF) module for executing an evaluation routine during a driving cycle to detect a fault in a component or sub-system in an engine management system and for generating a diagnostic trouble code (DTC) to indicate the operational status of said component or sub-system, said DF module comprising:

means (24) for determining the priority with which the evaluation routine associated with the DF module should be executed.

7. The DF module of claim 6, further comprising means for executing an evaluation routine to evaluate the operational status of said component or sub-system to which the DTC of the specific DF module relates, means for producing a ranking value dependent on the operating status of the component or sub-system being evaluated, said ranking value being generated each time an evaluation routine is performed;

means for processing and storing statistical results of the ranking values obtained over a number of evaluation routines;

means for evaluating said statistical results to produce evaluated data in the form of either an evaluated no-fault signal or an evaluated fault signal;

means for receiving said evaluated signals from said means for evaluating said statistical results to produce a controlled fault signal upon receipt of a predetermined number of evaluated fault signals;

means for deciding whether to store said controlled fault signal in the form of DTC-data for the remainder of the driving cycle;

means for determining whether to erase any stored DTC-data, and means for deciding whether to illuminate or extinguish a malfunction indication lamp dependent on the stored DTC-data.

8. A diagnostic system in an engine management system for generating a diagnostic trouble code (DTC) to indicate the operational status of a component or sub-system which is being evaluated by said diagnostic system, said diagnostic system comprising:

a diagnostic function module (DF module) for each DTC or a group of related DTCs, said DF module including means for executing an evaluation routine to evaluate the operational status of a component or sub-system to which the DTC of the specific DF module relates, and a dynamic scheduler for determining which evaluation routing associated with said DF module may be allowed to execute at a particular time;

wherein each DF module comprises means for determining the priority with which the evaluation routine associated with that DF module should be executed;

wherein said DF module further comprises means for comparing said evaluated data with previously generated data relating to evaluations of the component or sub-system to which the DTC of the specific DF module relates and, in the event that an evaluated fault signal is generated, for comparing said signal with subsequently produced evaluated data to thereby generate either a controlled fault signal or a controlled no-fault signal.

9. The system as claimed in claim 8, wherein said system includes a data collector module, and said DF module comprises means for sending a request to said data collector module to create DTC-data when a controlled fault signal is generated in said DF module.

10. The system as claimed in claim 9, wherein said data collector module comprises means for creating said DTC-data, said DTC-data being in the form of a DTC-block containing the DTC and information pertaining to operating conditions of the engine when said DTC was generated.

11. The system as claimed in claim 10, wherein said data collector module comprises means for transmitting said DTC-block to a validator module.

12. The system as claimed in claim 11, wherein said validator module comprises means for determining components or sub-systems on which the evaluated and subsequently generated DTC-block depends, and means for obtaining data pertaining to the operational status of said components or sub-systems on which said controlled no-fault signal is dependent.

13. The system as claimed in claim 12, wherein said validator module comprises means for evaluating said data pertaining to the operational status of said components or sub-systems on which said controlled no-fault signal is dependent to thereby determine whether said DTC-block is valid.

14. The system as claimed in claim 13, wherein said validator module comprises means for changing the DTC-block status to be valid in the event that the DTC-block is determined to be valid, and means for erasing the DTC-block in the event that the DTC-block is determined not to be valid.

* * * * *